US011133712B2

(12) United States Patent
Maniktala

(10) Patent No.: US 11,133,712 B2
(45) Date of Patent: Sep. 28, 2021

(54) WIRELESS POWER TRANSFER USING MULTIPLE COIL ARRAYS

(71) Applicant: ChargEdge, Inc., Fremont, CA (US)

(72) Inventor: Sanjaya Maniktala, Fremont, CA (US)

(73) Assignee: CHARGEDGE, INC., Fremont, CA (US)

(*) Notice: Subject to any disclaimer, the term of this patent is extended or adjusted under 35 U.S.C. 154(b) by 0 days.

(21) Appl. No.: 16/532,168

(22) Filed: Aug. 5, 2019

(65) Prior Publication Data
US 2020/0106304 A1    Apr. 2, 2020

Related U.S. Application Data

(63) Continuation of application No. 15/082,533, filed on Mar. 28, 2016, now Pat. No. 10,374,459.
(Continued)

(51) Int. Cl.
*H01F 27/42* (2006.01)
*H01F 37/00* (2006.01)
(Continued)

(52) U.S. Cl.
CPC .............. *H02J 50/12* (2016.02); *H02J 50/40* (2016.02); *H02J 50/70* (2016.02); *H01F 27/36* (2013.01); *H01F 38/14* (2013.01); *H02J 7/025* (2013.01)

(58) Field of Classification Search
CPC . H02J 5/005; H02J 7/025; H02J 17/00; H01F 38/14; B60L 11/182
(Continued)

(56) References Cited

U.S. PATENT DOCUMENTS 6,212,430 B1    4/2001  Kung
6,479,997 B1 *  11/2002 Westphal ........... G01R 33/3852
                                                           324/318
(Continued)

FOREIGN PATENT DOCUMENTS

WO    WO-2009027674 A1    3/2009
WO    WO-2010090539 A1    8/2010
(Continued)

OTHER PUBLICATIONS

Budhia, et al., "Development of a Single-Sided Flux Magnetic Coupler for Electric Vehile IPT Charging Systems," IEEE Transactions on Industrial Electronics., vol. 60, No. 1., pp. 318-328, Jan. 1, 2013.
(Continued)

*Primary Examiner* — Quan Tra
(74) *Attorney, Agent, or Firm* — White & Case LLP

(57) ABSTRACT

In one embodiment of a wireless power transmitter, two coils are magnetically coupled together by placing both coils on a magnetic layer. A power circuit generates an AC signal of a defined voltage magnitude that causes a current to flow through the first coil, which generates a magnetic field having a first polarity. The second coil is coupled to the first coil. Current flows through the second coil and generates a magnetic field having a second polarity that is opposite from the first polarity. Because the magnetic field generated by each coil has a different polarity, the magnetic fields attract and form a strong magnetic field that flows from the first coil to the second coil. The strong magnetic field can transfer greater amounts of power to a receiver in comparison to coil configurations that emit magnetic fields in the same direction that repel one another.

8 Claims, 9 Drawing Sheets

Related U.S. Application Data

(60) Provisional application No. 62/139,785, filed on Mar. 29, 2015.

(51) Int. Cl.

| | | |
|---|---|---|
| *H01F 38/00* | (2006.01) | |
| *H02J 50/12* | (2016.01) | |
| *H02J 50/40* | (2016.01) | |
| *H02J 50/70* | (2016.01) | |
| *H01F 38/14* | (2006.01) | |
| *H02J 7/02* | (2016.01) | |
| *H01F 27/36* | (2006.01) | |

(58) Field of Classification Search
USPC .......................................................... 307/104
See application file for complete search history.

(56) References Cited

U.S. PATENT DOCUMENTS

| | | | |
|---|---|---|---|
| 6,657,326 | B1 | 12/2003 | Yamamoto et al. |
| 7,221,251 | B2 * | 5/2007 | Menegoli ............ H01F 17/0006 336/200 |
| 7,948,781 | B2 | 5/2011 | Esaka et al. |
| 8,604,443 | B2 | 12/2013 | Sinclair et al. |
| 9,276,437 | B2 | 3/2016 | Partovi et al. |
| 2003/0052680 | A1 * | 3/2003 | Konijn ................. G01R 33/385 324/318 |
| 2005/0073466 | A1 | 4/2005 | Karlsen |
| 2006/0061324 | A1 | 3/2006 | Oglesbee |
| 2009/0096413 | A1 | 4/2009 | Partovi et al. |
| 2010/0181841 | A1 | 7/2010 | Azancot et al. |
| 2010/0259217 | A1 | 10/2010 | Baarman et al. |
| 2011/0057606 | A1 | 3/2011 | Saunamaki |
| 2011/0115429 | A1 | 5/2011 | Toivola et al. |
| 2011/0217927 | A1 | 9/2011 | Ben-Shalom et al. |
| 2011/0304216 | A1 | 12/2011 | Baarman |
| 2012/0154086 | A1 | 6/2012 | Willemsen et al. |
| 2013/0043734 | A1 | 2/2013 | Stone et al. |
| 2013/0093252 | A1 | 4/2013 | Norconk et al. |
| 2013/0093386 | A1 * | 4/2013 | Tsai ...................... H02J 7/0044 320/108 |
| 2013/0175877 | A1 | 7/2013 | Abe et al. |
| 2013/0214591 | A1 | 8/2013 | Miller et al. |
| 2013/0249479 | A1 | 9/2013 | Partovi |
| 2013/0307468 | A1 | 11/2013 | Lee et al. |
| 2014/0070622 | A1 | 3/2014 | Keeling et al. |
| 2014/0125140 | A1 | 5/2014 | Widmer et al. |
| 2014/0167688 | A1 | 6/2014 | Doyle et al. |
| 2014/0232330 | A1 | 8/2014 | Robertson et al. |
| 2014/0266031 | A1 | 9/2014 | Sasaki |
| 2014/0312834 | A1 | 10/2014 | Tanabe et al. |
| 2014/0340187 | A1 | 11/2014 | Werner et al. |
| 2015/0091388 | A1 | 4/2015 | Golko et al. |
| 2015/0123486 | A1 * | 5/2015 | Abe ....................... H01F 38/14 307/104 |
| 2015/0145343 | A1 | 5/2015 | Chiyo et al. |
| 2015/0295416 | A1 | 10/2015 | Li |
| 2015/0372493 | A1 | 12/2015 | Sankar |
| 2016/0001663 | A1 | 1/2016 | Chae et al. |
| 2016/0111887 | A1 | 4/2016 | Jeong |
| 2016/0121732 | A1 * | 5/2016 | Matsumoto ........... B60L 53/126 307/10.1 |
| 2016/0241084 | A1 * | 8/2016 | Guo ......................... H02J 50/90 |
| 2020/0047632 | A1 * | 2/2020 | Rumbak ................. H01F 38/14 |

FOREIGN PATENT DOCUMENTS

| | | |
|---|---|---|
| WO | WO-2013074332 A1 | 5/2013 |
| WO | WO-2013122483 A1 | 8/2013 |
| WO | WO-2013154440 A1 | 10/2013 |

OTHER PUBLICATIONS

Extended European Search Report—EP16773913.5 dated Nov. 15, 2018 (11 pages).
Maniktala, S. "The Confluence of Resonant Switching Topologies and Wireless Charging," presented at ISSCC 2015, San Francisco, CA, Feb. 26, 2015.
Maniktala, S., "Fixing EMI across the Board," EE Times, Novembers, 2003, http://www.eetimes.com/document.asp?doc_id=1230444.
Maniktala, S., "More on Designing Reliable Electronic Ballasts," EE Times, Apr. 20, 2005, http://www.eetimes.com/document.aps?doc_id=1272231.
Maniktala, S., "WPT Breaks All Connections, Part 1," EDN Network, Mar. 9, 2015, http://www.edn.com/design/power-management/4438850/WPT-breaks-all-connections-Part-1.
Maniktala, S., "WPT Breaks All Connections, Part 2," EDN Network, Mar. 14, 2015, http://www.edn.com/design/power-management/4438924/WPT-breaks-all-connections-Part-2.
Maniktala, S., "WPT Breaks All Connections, Part 3," EDN Network, Apr. 6, 2015, http://www.edn.com/design/power-management/4439125/WPT-breaks-all-connections-Part-3.
Notification of Transmittal of the International Search Report and The Written Opinion of the International Searching Authority, Int'l Appl. No. PCT/US2017/49756, dated Nov. 9, 2017.
Notification of Transmittal of the International Search Report and The Written Opinion of the International Searching Authority, Int'l Appl. No. PCT/US2016/024483, dated Jun. 20, 2016.
Notification of Transmittal of the International Search Report and The Written Opinion of the International Searching Authority, Int'l Appl. No. PCT/US2016/066105, dated Feb. 17, 2017.
Notification of Transmittal of the International Search Report and The Written Opinion of the International Searching Authority, Int'l Appl. No. PCT/US2017/020465, dated May 11, 2017.
Power Matters Alliance, "PMA Inductive Wireless Power and Charging Receiver Specification—System Release 1," PMA-TS-0001-0 v1.00, Nov. 16, 2013.
Power Matters Alliance, "PMA Inductive Wireless Power and Charging Transmitter Specification—System Release 1,"PMA-TS-0003-0 v2.00, Apr. 24, 2014.
Wireless Power Consortium, "Qi System Description Wireless Power Transfer," vol. I: Low Power, Part 1: Interface Definition, Version 1-1.2, Jun. 2013.

* cited by examiner

WIRELESS POWER TRANSFER USING MULTIPLE COIL ARRAYS

CROSS-REFERENCE TO RELATED APPLICATIONS

This application is a continuation of U.S. patent application Ser. No. 15/082,533, filed on Mar. 28, 2016, which claims the benefit of U.S. Provisional Patent Application No. 62/139,785, entitled "Wireless Power Transfer Method Using Multiple Coil Arrays," filed on Mar. 29, 2015. The subject matter of the related applications are hereby incorporated by reference in their entirety.

FIELD OF THE INVENTION

This invention relates generally to wireless power transfer and more specifically to a multiple coil array for wireless power transfer.

BACKGROUND

Electronic devices typically require a connected (wired) power source to operate, for example, battery power or a wired connection to a direct current ("DC") or alternating current ("AC") power source. Similarly, rechargeable battery-powered electronic devices are charged using a wired power-supply that connects the electronic device to a DC or AC power source. The limitation of these devices is the need to directly connect the device to a power source using wires.

Wireless power transfer (WPT) involves the use of time-varying magnetic fields to wirelessly transfer power from a source to a device. Faraday's law of magnetic induction provides that if a time-varying current is applied to one coil (e.g., a transmitter coil) a voltage will be induced in a nearby second coil (e.g., a receiver coil). The voltage induced in the receiver coil can then be rectified and filtered to generate a stable DC voltage for powering an electronic device or charging a battery. The receiver coil and associated circuitry for generating a DC voltage can be connected to or included within the electronic device itself such as a smartphone.

The Wireless Power Consortium (WPC) was established in 2008 to develop the Qi inductive power standard for charging and powering electronic devices. Powermat is another well-known standard for WPT developed by the Power Matters Alliance (PMA). The Qi and Powermat near-field standards operate in the frequency band of 100-400 kHz. The problem with near-field WPT technology is that typically only 5 Watts of power can be transferred over the short distance of 2 to 5 millimeters between a power source and an electronic device, though there are ongoing efforts to increase the power. For example, some concurrently developing standards achieve this by operating at much higher frequencies, such as 6.78 MHz or 13.56 MHz. Though they are called magnetic resonance methods instead of magnetic induction, they are based on the same underlying physics of magnetic induction. There also have been some market consolidation efforts to unite into larger organizations, such as the AirFuel Alliance consisting of PMA and the Rezence standard from the Alliance For Wireless Power (A4WP), but the technical aspects have remained largely unchanged.

Some techniques for WPT use two or more transmitter coils in an attempt to overcome the issue of low power transfer over short distances. Typically, two identical transmitter coils (e.g., both wound in the clockwise direction or both wound in the counter-clockwise direction and having the same number of turns and area) are coupled in series or parallel on a single magnetic layer to transfer power to a receiver coil. Alternatively, the coils can be placed in close proximity to one another without the use of a magnetic layer. This configuration results in the applied time-varying current flowing through both coils in the same direction at any point in time, generating an almost perpendicular combined magnetic field with flux lines that flow from both coils in the same direction (i.e., the magnetic field generated by either coil has the same polarity as the other coil). Magnetic flux lines tend to repel if they are in the same direction, which causes the flux lines to radiate through the air for great distances. When magnetic flux lines repel, the magnetic reluctance is high, resulting in a weak magnetic field that reduces the amount of magnetic coupling between the transmitter coils and a receiver coil placed in close proximity (i.e., 2-5 millimeters) to the transmitter coils. So although the coil area is larger than in a single-coil transmitter, the resulting magnetic flux available to transfer power is reduced. If the transmitter coils are placed on separate magnetic layers, an air gap exists between the magnetic layers resulting in an even weaker generated magnetic field as the air gap further increases the reluctance between the transmitter coils.

When multiple transmitter coils are used there is an additional problem with meeting Electromagnetic Interference (EMI) requirements, including, for example, spurious emissions requirements set forth by the Federal Communications Commission (FCC) and the European Telecommunications Standard Institute (ETSI). When magnetic flux lines radiate away from a transmitter coil into the environment, there is a higher likelihood that the emissions will exceed EMI compliance standards. Additionally, flux lines tend to radiate into the atmosphere if a transmitter coil is driven without a receiver coil to receive the generated flux. To avoid this issue, such multiple coil arrangements require polling the transmitter coils to determine which transmitter coils are providing power to a receiver coil (e.g., smartphone with a receiver coil placed over the transmitter coil) and disabling all other unused transmitter coils. If only a single transmitter coil is used to meet EMI requirements, this implementation will suffer from the same low power and short distance of power transfer issues discussed above.

Transmitters that comply with existing WPT standards also achieve substantially lower power transfer to an electronic device if the receiver coil in the electronic device is not properly centered over the transmitter coil. One technique used to address this issue is increasing the frequency of the time-varying current applied to the transmitter coil (e.g., frequencies above 400 kHz). Although higher frequencies of operation may increase the amount of power transferred over the distance between a transmitter coil and a receiver coil, higher frequencies of operation may interfere with the operation of other devices and may fail EMI compliance requirements by emitting energy in neighboring frequency bands that exceed spurious emission requirements.

Due to the short range of existing WPT technology, the transmitter coil must be centered with the receiver coil connected to a device and the coils cannot be more than 2-5 millimeters apart. This makes it difficult to implement wireless power transfer for devices that are not perfectly flat or do not have a large enough area for embedding a receiver coil (e.g., Android® wearable devices, Apple® watch, Fit-bit® fitness tracker, etc.). The limitations of WPT also affect smartphones if the charging surface with the transmitter coil is not large enough to allow the smartphone device to sit flat on the surface (e.g., in vehicles, which typically do not have a large enough flat surface to accommodate a smartphone device). Thus, the current state of WPT technology is not suitable for many consumer devices.

SUMMARY OF THE INVENTION

Wireless power transfer using multiple coils configured to generate a strong magnetic field allows for greater amounts of wireless power transfer without exceeding EMI compliance requirements. In one embodiment, two coils are magnetically coupled together by placing both coils on a magnetic layer. A power circuit generates an AC signal that causes a current to flow through the first coil in a first direction and a current to flow through the second coil in a second direction that is opposite from the first direction. The first coil generates a magnetic field having a first polarity and the second coil generates a magnetic field having a second polarity, where the first polarity is opposite from the second polarity. Because the magnetic field generated by each coil has a different polarity, the magnetic fields attract to form a strong magnetic field that flows from the first coil to the second coil.

In another embodiment, pairs of coils are magnetically coupled together by placing each pair of coils on a separate magnetic layer (e.g., coils 1 and 2 are on magnetic layer 1, coils 3 and 4 are on magnetic layer 2, etc.). Coils coupled together using the same magnetic layer are configured such that a current flows through each coil in an opposite direction, resulting in each coil generating a magnetic field with opposing polarity. The opposing magnetic fields attract to form strong magnetic fields. The strong magnetic fields generated by each pair of coils do not affect one another because the air gap results in high reluctance between coils on different magnetic layers.

In another embodiment, four coils are magnetically coupled together by placing the coils on a magnetic layer. The magnetic layer contains an air gap for separating coils that generate magnetic fields with the same polarity. A power circuit generates an AC signal that causes a current to flow through the first coil in a first direction and a current to flow through the second coil in a second direction that is opposite from the first direction. The first coil generates a magnetic field having a first polarity and the second coil generates a second magnetic field having a second polarity that is opposite from the first polarity. The third coil is coupled to the second coil in such a way that a current flows through the third coil in a third direction that is opposite from the second direction. The third coil generates a third magnetic field having a third polarity that is opposed from the second polarity. The fourth coil is coupled to the second coil in such a way that a current flows through the fourth coil in a fourth direction that is opposite from the third direction and the first direction. The fourth coil generates a fourth magnetic field having a fourth polarity that is opposite from the third polarity and the first polarity. Magnetic fields having opposing polarity attract to form strong magnetic fields. Coils that generate magnetic fields having the same polarity are separated by the air gap in the magnetic layer resulting in high reluctance between the coils.

In another embodiment, two coils are magnetically coupled together by placing both coils on a magnetic layer. A wireless power transmitter emits a magnetic field that couples onto each coil causing a time-varying current to flow through each coil. The time-varying current flows through each coil to a receive circuit that can include a rectifier to generate a DC voltage, a filter to reduce noise, and a voltage regulator to define a voltage magnitude and maintain the voltage under load.

In another embodiment, a magnetic layer is not used. Coils that generate magnetic fields having opposite polarity can be placed in close proximity to one another and coils that generate magnetic fields having the same polarity can be placed farther apart from one another.

In another embodiment, coils that generate magnetic fields having opposite polarity can be placed in such a way that the coils partially overlap.

DETAILED DESCRIPTION

Figure 1:
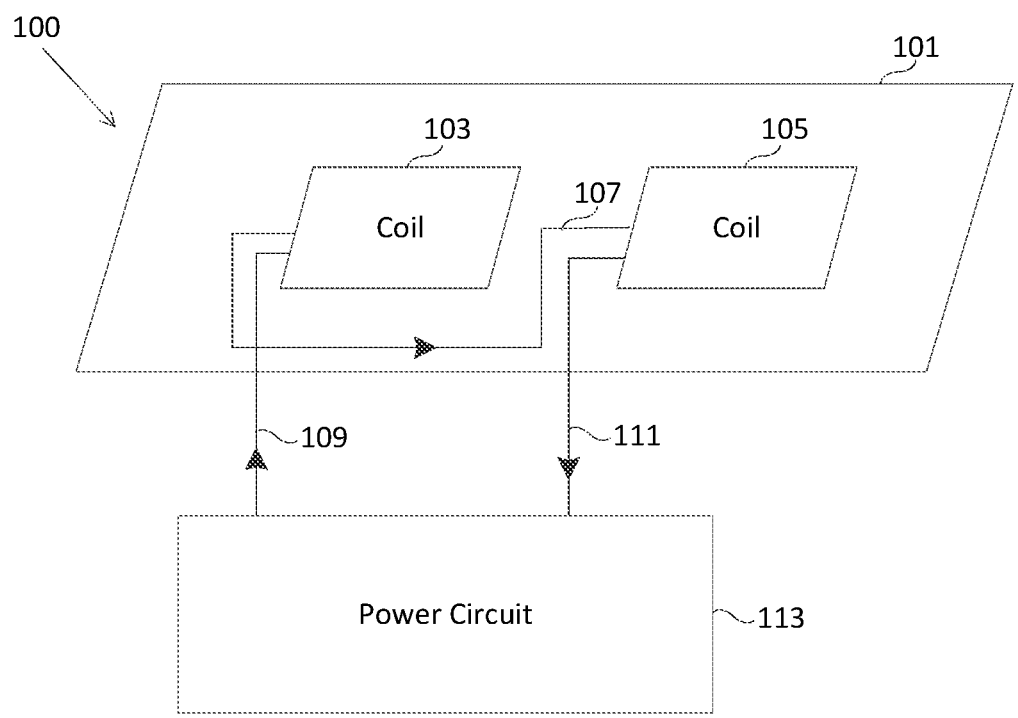
FIG. 1 is a block diagram illustrating one embodiment of a wireless power transmitter.

FIG. 1 is a block diagram illustrating one embodiment of wireless power transmitter 100. A coil 103 and a coil 105 are magnetically coupled together by placing both coils on a magnetic layer 101. Magnetic layer 101 can be ferrite or any other magnetic layer known in the art. Coil 103 and coil 105 are preferably identical coils with the same number of turns, the same area, and wound in the same direction (i.e., clockwise or counter-clockwise). A power circuit 113 generates an AC signal of a defined voltage magnitude. The generated AC signal can be, but is not limited to, a square wave, a sinusoidal wave, a triangular wave, or a sawtooth wave. The AC signal causes current to flow from power circuit 113 to coil 103 through a connection 109. The flow of current through coil 103 generates a magnetic field. The current flows from coil 103 to coil 105 through a connection 107. If coils 103 and 105 are identical, the flow of current through coil 105 generates a magnetic field equivalent in magnitude to the magnetic field generated by coil 103. The current flows from coil 105 to power circuit 113 through a connection 111. Coils 103 and 105 and connections 107, 109 and 111 can be formed of wire or traces on a printed circuit board using conductive material such as copper, gold, or any other conductive material known in the art.

Figure 2:
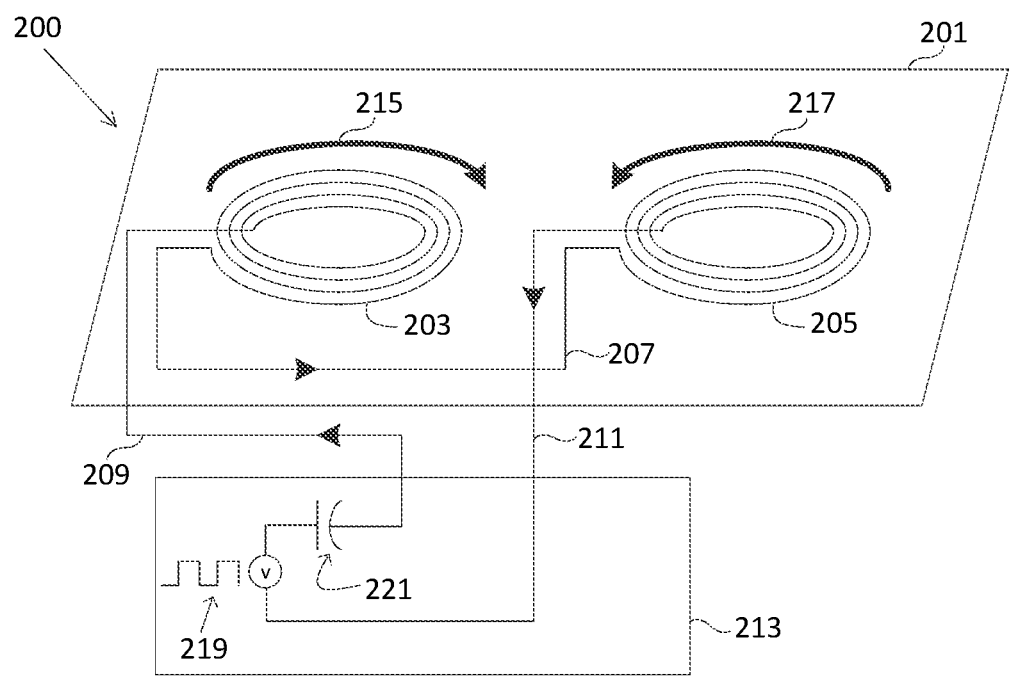
FIG. 2 is a schematic diagram illustrating one embodiment of a wireless power transmitter using two coils coupled in series.

FIG. 2 is a schematic diagram illustrating one embodiment of a wireless power transmitter 200 using two coils coupled in series. A coil 203 and a coil 205 are magnetically coupled together by placing both coils on a magnetic layer 201. Magnetic layer 201 can be ferrite or any other magnetic layer known in the art. Coil 203 and coil 205 are preferably identical coils with the same number of turns, the same area, and wound in the same direction. Coil 203 and coil 205 are both wound in the clockwise direction but both coils could alternatively be wound in the counter-clockwise direction. A power circuit 213 generates an AC signal 219 of a defined voltage magnitude. AC signal 219 can be, but is not limited to, a square wave, a sinusoidal wave, a triangular wave, or a sawtooth wave.

Power circuit 213 includes a capacitor 221 to set the resonant frequency of transmitter 200. The resonant frequency of transmitter 200 is a function of the inductance of coil 203 and coil 205, and the capacitance of capacitor 221. Resonant frequency is in general calculated by:

$$F_R = \frac{1}{2\pi\sqrt{L \cdot C}}$$

In the case of coupled coils, a coupled or mutual inductance term causes some deviation from the above general equation, which we are ignoring here for simplicity. For example, if coil 203 has an inductance of 250 µH, coil 205 has an inductance of 250 µH and capacitor 221 has a capacitance of 5 nF, the resonant frequency of transmitter 200 is 100.66 kHz. The preferable resonant frequency range for operating a wireless power transmitter is between 100-400 kHz to reduce the likelihood of exceeding EMI compliance requirements, however, any resonant frequency is within the scope of the invention.

Power circuit 213 generates AC signal 219, which flows through capacitor 221 to coil 203 through a connection 209. A current 215 flows through coil 203 in the clockwise direction. The clockwise flow of current 215 through coil 203 generates a magnetic field. Current 215 flows from coil 203 to coil 205 through a connection 207 (i.e., coil 203 is coupled in series with coil 205). A current 217 flows through coil 205 in the counter-clockwise direction. Current 215 is equivalent in magnitude to current 217 but flows in the opposite direction. If coils 203 and 205 are identical, the flow of current 215 through coil 203 generates a magnetic field equivalent in magnitude to the magnetic field generated by the flow of current 217 through coil 205. Because current 215 and current 217 are flowing in opposite directions at any given point in time, the magnetic field generated by current 215 is in a different direction than the magnetic field generated by current 217 (i.e., the magnetic fields have different polarity). Current 217 flows from coil 205 to power circuit 213 through a connection 211. Coils 203 and 205 and connections 207, 209 and 211 can be formed of wire or traces on a printed circuit board using conductive material such as copper, gold, or any other conductive material known in the art.

Figure 3:
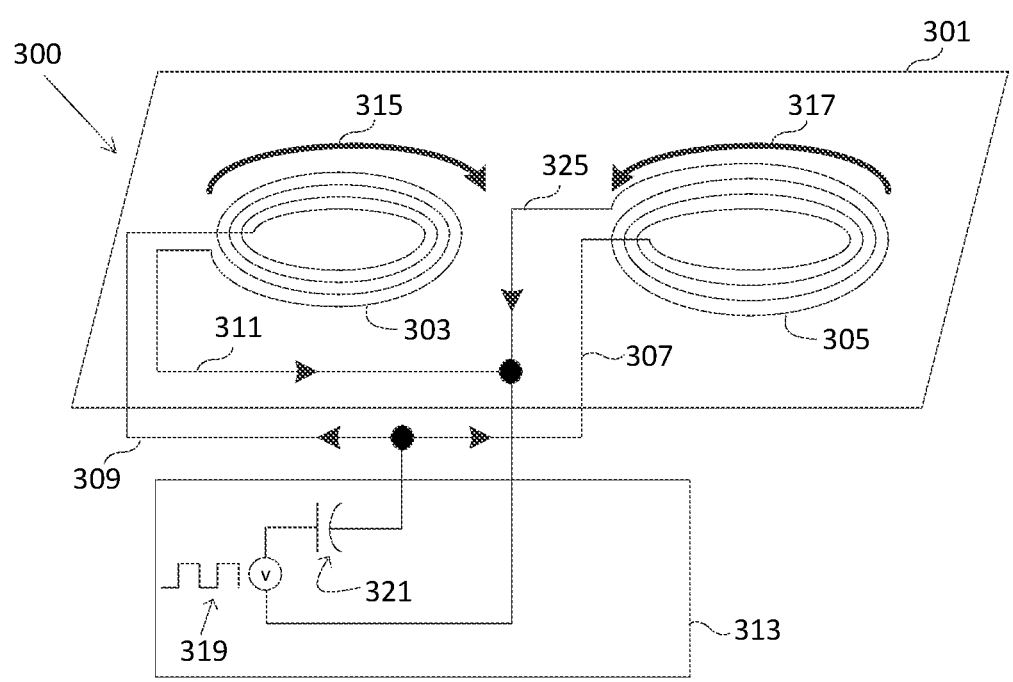
FIG. 3 is a schematic diagram illustrating one embodiment of a wireless power transmitter using two coils coupled in parallel.

FIG. 3 is a schematic diagram illustrating one embodiment of a wireless power transmitter 300 using two coils coupled in parallel. A coil 303 and a coil 305 are magnetically coupled together by placing both coils on magnetic layer 301. Magnetic layer 301 can be ferrite or any other magnetic layer known in the art. Coil 303 and coil 305 preferably have the same number of turns and the same area. However, unlike the embodiment of FIG. 2, coil 303 and coil 305 are wound in opposite directions. Although FIG. 3 shows coil 303 as wound in the clockwise direction and coil 305 as wound in the counter-clockwise direction, coil 303 could be wound in the counter-clockwise direction and coil 305 could be wound in the clockwise direction. A power circuit 313 generates an AC signal 319 of a defined voltage magnitude. AC signal 319 can be, but is not limited to, a square wave, a sinusoidal wave, a triangular wave, or a sawtooth wave.

Similar to the embodiment of FIG. 2, power circuit 313 includes a capacitor 321 to set the resonant frequency of transmitter 300. Power circuit 313 generates AC signal 319, which flows through capacitor 321 to coil 303 through a connection 309 and coil 305 through a connection 307 (i.e., coil 303 is in parallel with coil 305). A current 315 flows through coil 303 in the clockwise direction. The clockwise flow of current 315 through coil 303 generates a magnetic field. A current 317 flows through coil 305 in the counter-clockwise direction. Current 315 is equivalent in magnitude to current 317 but flows in an opposite direction. If coil 303 and coil 305 have the same number of turns and area, the flow of current 317 through coil 305 generates a magnetic field equivalent in magnitude to the magnetic field generated by the flow of current 315 through coil 303. Because current 315 and current 317 are flowing in opposite directions at any given point in time, the magnetic field generated by current 315 is in a different direction than the magnetic field generated by current 317 (i.e., the magnetic fields have different polarity). Current 315 flows from coil 303 to power circuit 313 through a connection 311. Current 317 flows from coil 305 to power circuit 313 through a connection 325. Coils 303 and 305 and connections 307, 309, 311 and 325, can be formed of wire or traces on a printed circuit board using conductive material such as copper, gold, or any other conductive material known in the art.

Figure 4:
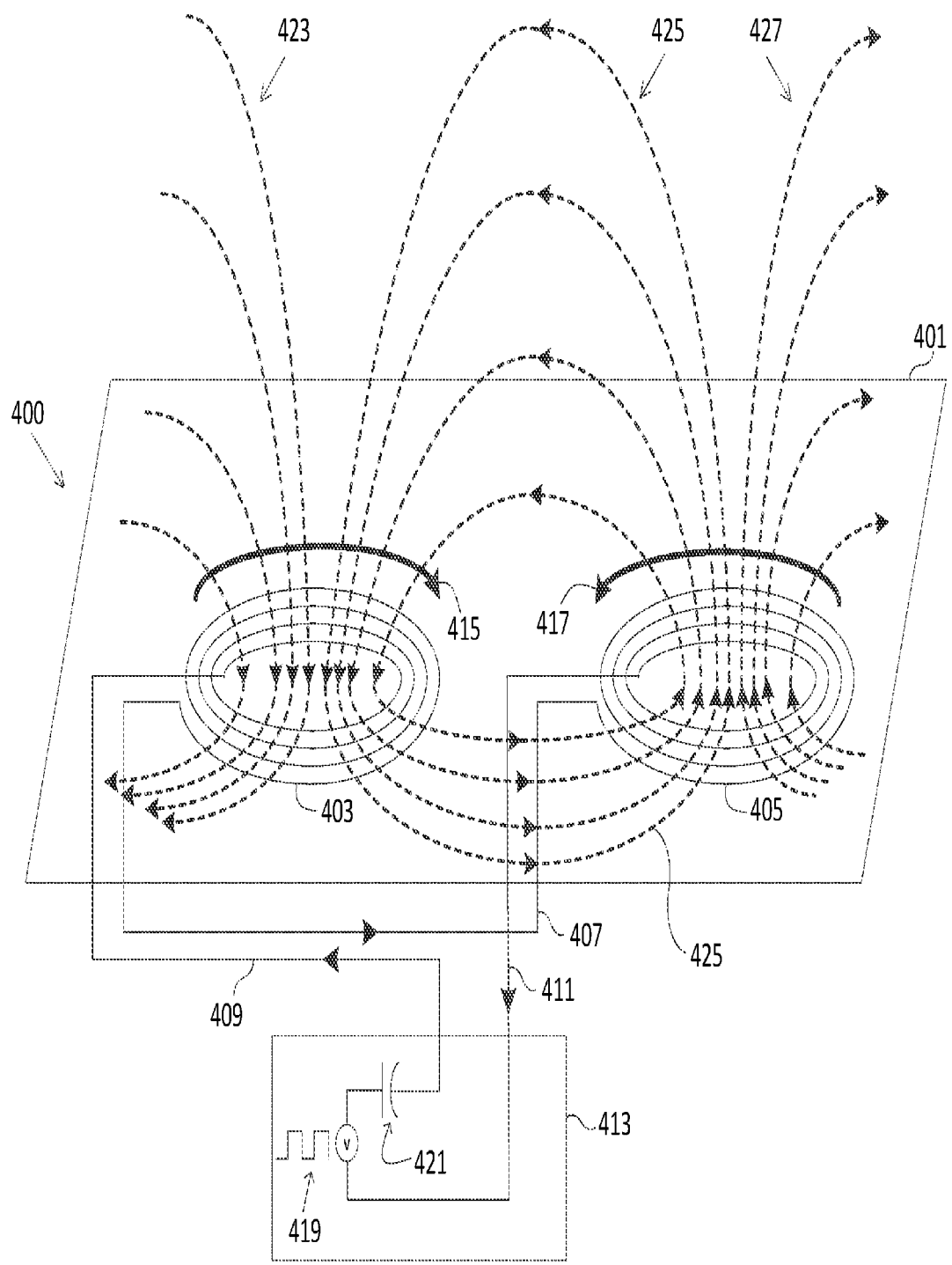
FIG. 4 is a schematic diagram illustrating one embodiment of a wireless power transmitter with magnetic coupling of the flux lines emitted from two coils.

FIG. 4 is a schematic diagram illustrating one embodiment of a wireless power transmitter 400 with magnetic coupling of flux lines emitted from two coils. A coil 403 and a coil 405 are magnetically coupled together by placing both coils on a magnetic layer 401. Magnetic layer 401 can be ferrite or any other magnetic layer known in the art. Coil 403 and coil 405 are preferably identical coils with the same number of turns, the same area, and wound in the same direction. Coil 403 and coil 405 are both wound in the clockwise direction but both coils could alternatively be wound in the counter-clockwise direction. A power circuit 413 generates an AC signal 419 of a defined voltage magnitude. AC signal 419 can be, but is not limited to, a square wave, a sinusoidal wave, a triangular wave, or a sawtooth wave.

Similar to the embodiment of FIG. 2, power circuit 413 includes a capacitor 421 to set the resonant frequency of transmitter 400. Power circuit 413 generates AC signal 419, which flows through capacitor 421 to coil 403 through a connection 409. A current 415 flows through coil 403 in the clockwise direction. The clockwise flow of current 415 through coil 403 generates a magnetic field represented by flux lines 423. Flux lines 423 flow perpendicular to current 415. According to the "right-hand-rule," the clockwise flow of current 415 through coil 403 causes flux lines 423 to flow in the downward direction. Current 415 flows from coil 403 to coil 405 through a connection 407 (i.e., coil 403 is in series with coil 405). A current 417 flows through coil 405 in the counter-clockwise direction. The counter-clockwise flow of current 417 through coil 405 generates a magnetic field represented by flux lines 427. Flux lines 427 flow perpendicular to current 417. According to the "right-handrule," the counter-clockwise flow of current 417 through coil 405 causes flux lines 427 to flow in the upward direction.

Current 415 is equivalent in magnitude to current 417 but flows in an opposite direction. If coil 403 and coil 405 are identical, the flow of current 415 through coil 403 generates a magnetic field equivalent in magnitude to the magnetic field generated by the flow of current 417 through coil 405. Because current 415 and current 417 are flowing in opposite directions at any given point in time, the magnetic field generated by current 415 is in a different direction than the magnetic field generated by current 417 (i.e., the magnetic fields have different polarity). Further, because flux lines 423 and flux lines 427 are flowing in opposite directions, the magnetic reluctance between flux lines 423 and flux lines 427 is low, causing flux lines 423 and flux lines 427 to attract to each other. Flux lines 423 and flux lines 427 magnetically couple to form closed flux lines 425. When flux lines close, the amount of flux that radiates in to the atmosphere is reduced, which reduces the amount of EMI radiation and increases the likelihood of meeting EMI compliance requirements. Flux lines 425 form a strong magnetic field that can transfer greater amounts of power to a receiver in comparison to coil configurations that emit flux lines in the same direction that repel one another. Further, flux lines 425 provide a greater area over which WPT can occur. That means a receiver coil does not need to be precisely centered over coils 403 and 405 to enable WPT. However, ensuring that the receiver coil is centered over flux lines 425 will enable greater amounts of power transfer than if the receiver coil is offset from the transmitter coils.

Current 417 flows from coil 405 to power circuit 413 through a connection 411. Coils 403 and 405 and connections 407, 409 and 411 can be formed of wire or traces on a printed circuit board using conductive material such as copper, gold, or any other conductive material known in the art.

Although the embodiment of FIG. 4 has been described with coil 403 and coil 405 coupled in series, the same result can be achieved by coupling coils in parallel as described in the embodiment of FIG. 3. Similar to flux lines 425 of FIG. 4, currents 315 through coil 303 and current 317 through coil 305 in the embodiment of FIG. 3 generate flux lines that flow in opposing directions and magnetically couple, forming a strong magnetic field for WPT to a receiver coil.

Figure 5:
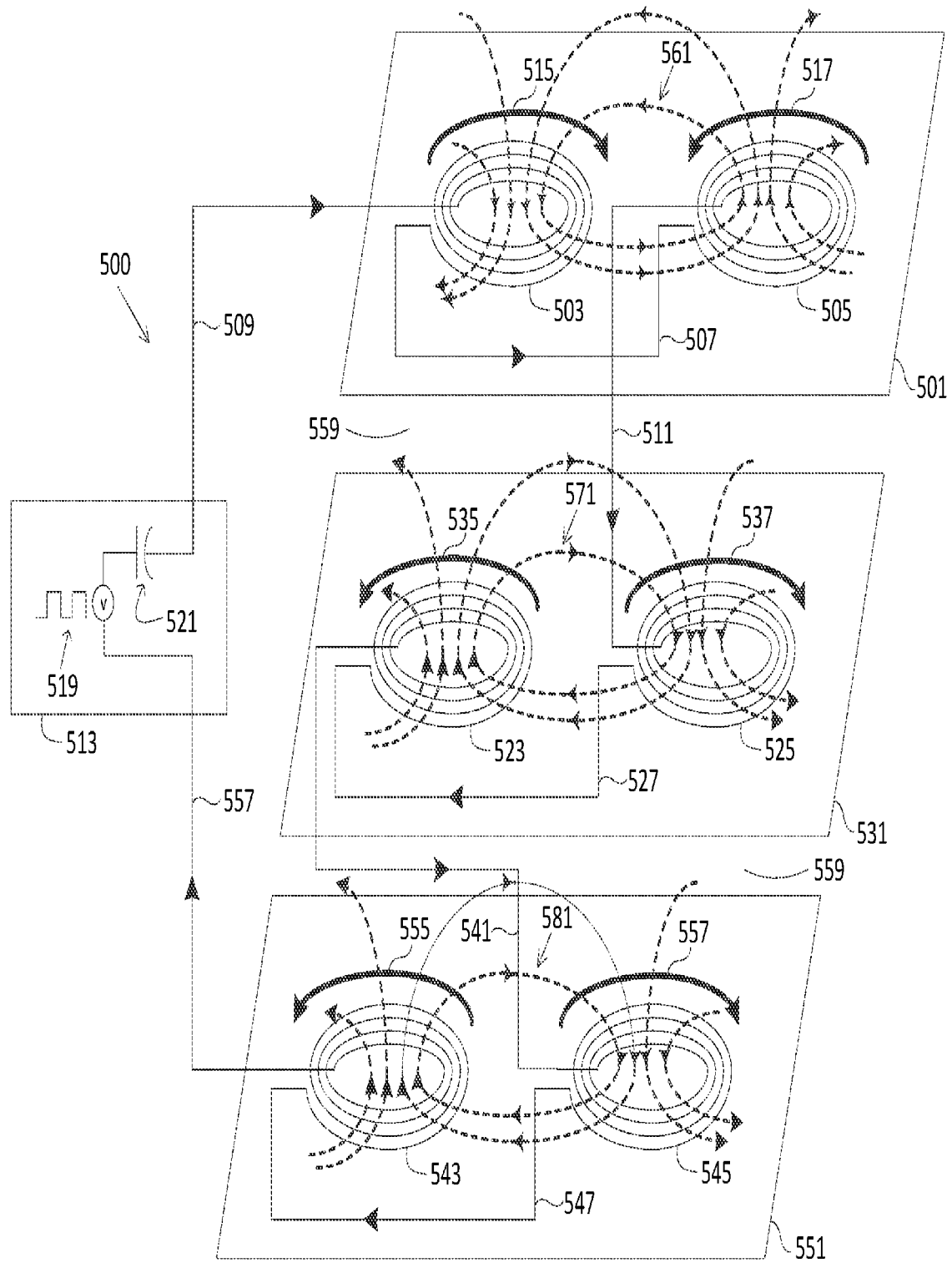
FIG. 5 is a schematic diagram illustrating one embodiment of a wireless power transmitter with magnetic coupling of the flux lines emitted from pairs of coils on separate magnetic layers.

FIG. 5 is a schematic diagram illustrating one embodiment of a wireless power transmitter 500 with magnetic coupling of the flux lines emitted from pairs of coils on separate magnetic layers. A coil 503 and a coil 505 are magnetically coupled together by placing both coils on a magnetic layer 501. Similarly, a coil 523 and a coil 525 are magnetically coupled through a magnetic layer 531 and a coil 543 and a coil 545 are magnetically coupled through a magnetic layer 551. Magnetic layers 501, 531 and 551 are separated by air gaps 559 resulting in high reluctance between coils that are located on different magnetic layers. Magnetic layers 501, 531 and 551 can be ferrite or any other magnetic layer known in the art. Coils coupled together using the same magnetic layer (e.g., coil 503 and coil 505 on magnetic layer 501) are preferably identical coils with the same number of turns, the same area, and wound in the same direction. Coils 503, 505, 523, 525, 543 and 545 are wound in the clockwise direction. Coils coupled together using the same magnetic layer (e.g., coil 503 and coil 505) can alternatively be wound in the counter-clockwise direction. A power circuit 513 generates an AC signal 519 of a defined voltage magnitude. AC signal 519 can be, but is not limited to, a square wave, a sinusoidal wave, a triangular wave, or a sawtooth wave.

Similar to the embodiment of FIG. 2, power circuit 513 includes a capacitor 521 to set the resonant frequency of transmitter 500. Power circuit 513 generates AC signal 519, which flows through capacitor 521 to coil 503 through a connection 509. A current 515 flows through coil 503 in the clockwise direction. The clockwise flow of current 515 through coil 503 generates a magnetic field that causes flux lines to flow in the downward direction. Current 515 flows from coil 503 to coil 505 through a connection 507 (i.e., coil 503 is in series with coil 505). A current 517 flows through coil 505 in the counter-clockwise direction. The counter-clockwise flow of current 517 through coil 505 generates a magnetic field that causes flux lines to flow in the upward direction. Because the flux lines from coil 503 and coil 505 flow in opposite directions, the magnetic reluctance is low, and the flux lines magnetically couple together to form closed flux lines 561. As described within the embodiment of FIG. 4, flux lines that magnetically couple form a strong magnetic field that can transfer greater amounts of power to a receiver coil.

Coil 525 and coil 523 are coupled together through magnetic layer 531. AC signal 519 flows from coil 505 to coil 525 through a connection 511. A current 537 flows through coil 525 in the clockwise direction, which generates a magnetic field that causes flux lines to flow in the downward direction. AC signal 519 flows from coil 525 to coil 523 through a connection 527. A current 535 flows through coil 523 in the counter-clockwise direction, which generates a magnetic field that causes flux lines to flow in the upward direction. Because flux lines from coil 523 and coil 535 flow in opposite directions, the magnetic reluctance is low, and the flux lines magnetically couple together to form closed flux lines 571.

Coil 543 and coil 545 are coupled together through magnetic layer 551. AC signal 519 flows from coil 523 to coil 545 through connection 541. A current 557 flows through coil 545 in the clockwise direction, which generates a magnetic field that causes flux lines to flow in the downward direction. AC signal 519 flows from coil 545 to coil 543 through a connection 547. A current 555 flows through coil 543 in the counter-clockwise direction, which generates a magnetic field that causes flux lines to flow in the upward direction. Because flux lines from coil 543 and coil 545 flow in opposite directions, the magnetic reluctance is low, and the flux lines magnetically couple together to form closed flux lines 581.

Current 555 flows from coil 543 to power circuit 513 through a connection 557. Although current 535 through coil 523 and current 555 through coil 543 both flow in the counter-clockwise direction, the flux lines emitted by these coils will not interfere with the magnetic coupling of closed flux lines 571 or 581 because these coils are on different magnetic layers 531 and 551 and are separated by air gaps 559. The same is true for coil 525 and coil 545.

The embodiment of FIG. 5 has been described with coils 503, 505, 523, 525, 543 and 545 coupled in series. The same result of closed flux lines can be achieved by coupling coils in parallel as described in the embodiment of FIG. 3. For example, coils coupled together using the same magnetic layer (e.g., coil 503 and coil 505 on magnetic layer 501) would be wound in opposite directions and connected in parallel. The embodiment of FIG. 5 can further be expanded by adding coil pairs that generate strong magnetic fields, where each additional coil pair is on a separate magnetic material.

Figure 6:
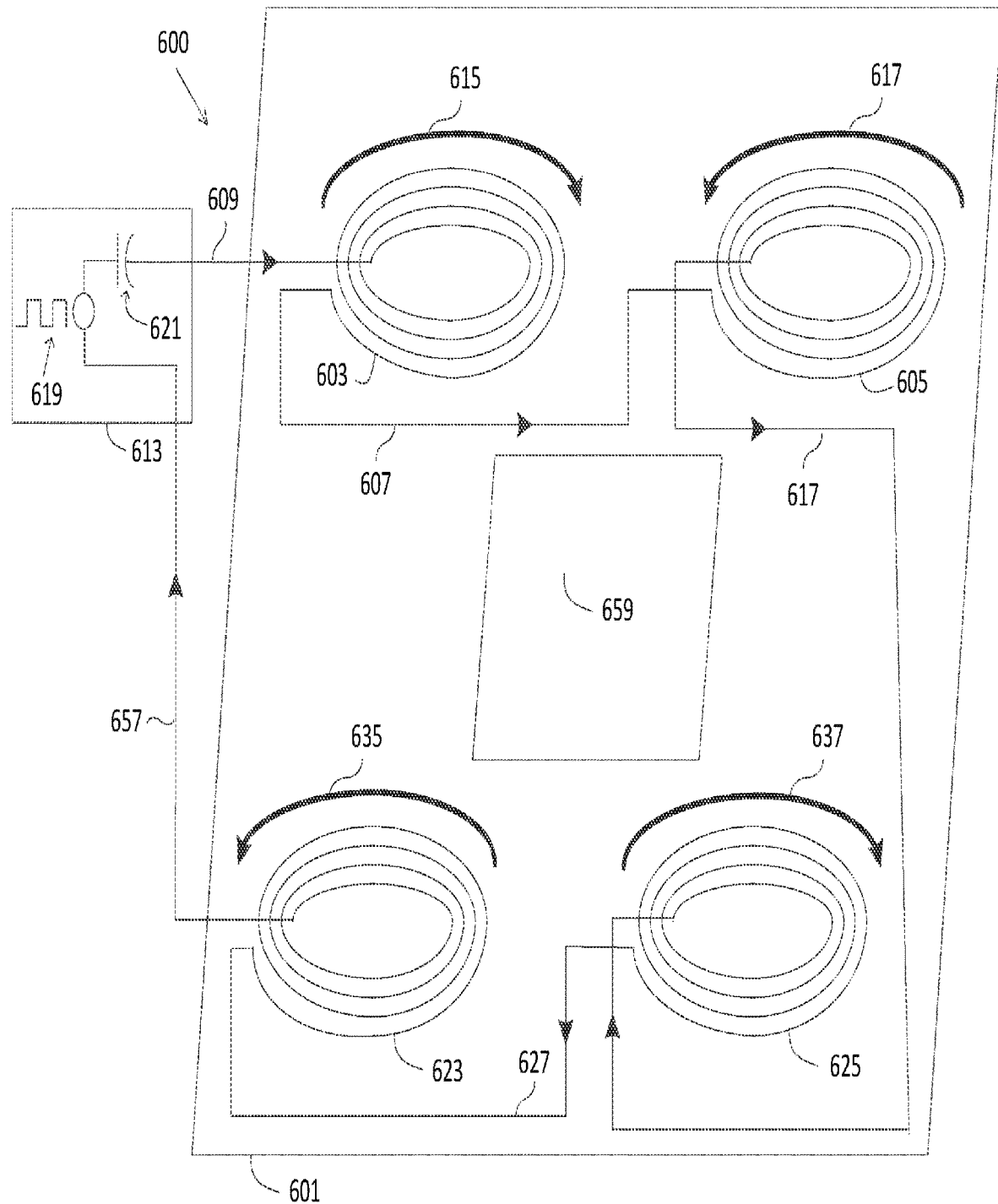
FIG. 6 is a schematic diagram illustrating one embodiment of a wireless power transmitter with four coils on the same magnetic layer with an air gap separating coils that generate magnetic fields with the same polarity.

FIG. 6 is a schematic diagram illustrating one embodiment of a wireless power transmitter 600 with four coils on the same magnetic layer and an air gap separating coils that generate magnetic fields with the same polarity. Coils 603, 605, 623 and 625 are placed on a magnetic layer 601. A power circuit 613 generates an AC signal 619 of a defined voltage magnitude. AC signal 619 can be, but is not limited to, a square wave, a sinusoidal wave, a triangular wave, or a sawtooth wave. Similar to the embodiment of FIG. 2, power circuit 613 includes a capacitor 621 to set the resonant frequency of transmitter 600.

Power circuit 613 generates AC signal 619, which flows through capacitor 621 to coil 603 through a connection 609. A current 615 flows through coil 603 in the clockwise direction, which generates a magnetic field that causes flux lines (not shown) to flow in the downward direction. AC signal 619 flows from coil 603 to coil 605 through a connection 607. A current 617 flows through coil 605 in the counter-clockwise direction, which generates a magnetic field that causes flux lines (not shown) to flow in the upward direction. Because flux lines from coil 603 and coil 605 flow in opposite directions, the magnetic reluctance is low, and the flux lines magnetically couple together to form closed flux lines (not shown) that are connected between coil 603 and coil 605, creating a strong magnetic field.

AC signal 619 flows from coil 605 to coil 625 through a connection 617. A current 637 flows through coil 625 in the clockwise direction, which generates a magnetic field that causes flux lines (not shown) to flow in the downward direction. Because flux lines from coil 605 and coil 625 are flowing in opposite directions, the magnetic reluctance is low, and the flux lines magnetically couple together to form closed flux lines (not shown) that are connected between coil 605 and coil 625 and create a strong magnetic field.

AC signal 619 flows from coil 625 to coil 623 through a connection 627. A current 635 flows through coil 623 in the counter-clockwise direction, which generates a magnetic field that causes flux lines (not shown) to flow in the upward direction. Because flux lines from coil 623 and coil 635 are flowing in opposite directions, the magnetic reluctance is low, and the flux lines magnetically couple together to form closed flux lines (not shown) that are connected between coil 625 and coil 623 and create a strong magnetic field. Similarly, flux lines from coil 623 and coil 603 magnetically couple together to form closed flux lines (not shown) that are connected between coil 623 and coil 603 because the flux lines from coil 623 and coil 603 are flowing in opposite directions.

Current 635 flows from coil 633 to power circuit 613 through a connection 657. Although current 635 through coil 623 and current 617 through coil 605 both flow in the counter-clockwise direction (i.e., the magnetic field generated by current 635 through coil 623 and the magnetic field generated by current 617 through coil 605 have the same polarity), the flux lines emitted by these coils will not affect magnetic coupling of flux lines between coils 603 and 605, coils 605 and 625, coils 625 and 623, and coils 623 and 603. Coil 623 and coil 605 are not adjacent to one another, and instead, are separated by an air gap 659 in magnetic layer 601, which results in high reluctance between the flux lines of coil 605 and coil 623. The same is true for coil 603 and coil 625. In contrast, coils that generate magnetic fields with opposite polarity are arranged adjacent to one another (e.g., coils 603 and 605, coils 605 and 625, coils 625 and 623, and coils 623 and 607) and are not separated by air gap 659, resulting in low reluctance between the coils and coupling of the magnetic fields creating strong magnetic fields.

The embodiment of FIG. 6 has been described with coils 603, 605, 623 and 625 coupled in series. The same result of closed flux lines can be achieved by coupling coils in parallel as described in the embodiment of FIG. 3. For example, coil 603 (wound in the clockwise direction) could be connected in parallel with coil 605 (wound in the counter-clockwise direction) and coil 623 (wound in the counter-clockwise direction) could be connected in parallel with coil 625 (wound in the clockwise direction). Alternatively, coil 605 (wound in the counter-clockwise direction) could be connected in parallel with coil 625 (wound in the clockwise direction) and coil 623 (wound in the counter-clockwise direction) could be connected in parallel with coil 603 (wound in the clockwise direction).

Figure 7:
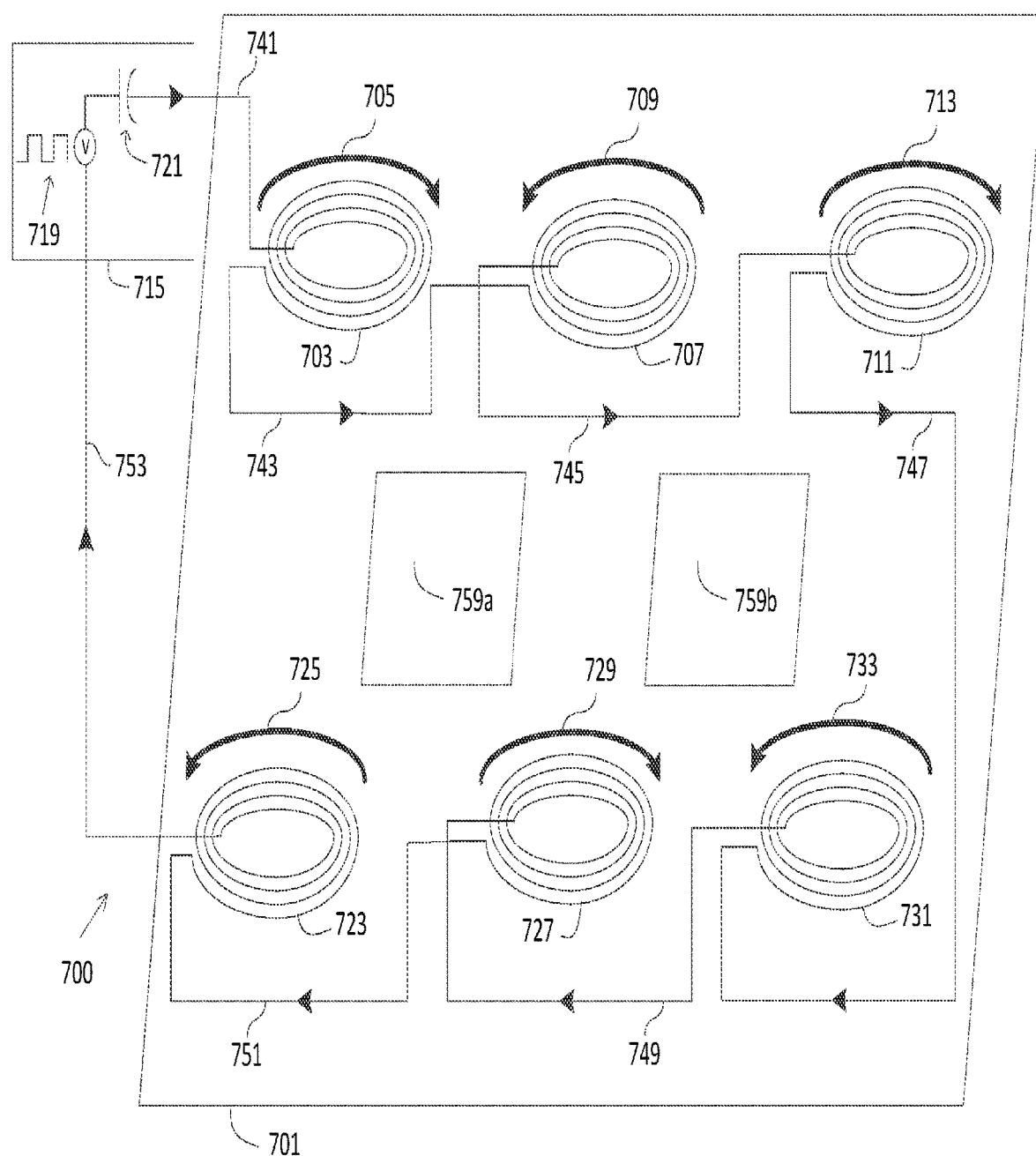
FIG. 7 is a schematic diagram illustrating one embodiment of a wireless power transmitter with six coils on the same magnetic layer with air gaps separating coils that generate magnetic fields with the same polarity.

FIG. 7 is a schematic diagram illustrating one embodiment of a wireless power transmitter 700 with six coils on the same magnetic layer with air gaps separating coils that generate magnetic fields with the same polarity. Coils 703, 707, 711, 723, 727 and 731 are placed on a magnetic layer 701. A power circuit 715 generates an AC signal 719 of a defined voltage magnitude. AC signal 719 can be, but is not limited to, a square wave, a sinusoidal wave, a triangular wave, or a sawtooth wave. Similar to the embodiment of FIG. 2, power circuit 715 includes a capacitor 721 to set the resonant frequency of transmitter 700.

Power circuit 715 generates AC signal 719, which flows through capacitor 721 to coil 703 through a connection 741. A current 705 flows through coil 703 in the clockwise direction, which generates a magnetic field that causes flux lines (not shown) to flow in the downward direction. AC signal 719 flows from coil 703 to coil 707 through a connection 743. A current 709 flows through coil 707 in the counter-clockwise direction, which generates a magnetic field that causes flux lines (not shown) to flow in the upward direction. Because flux lines from coil 703 and coil 707 are flowing in opposite directions, the magnetic reluctance is low, and the flux lines magnetically couple together to form closed flux lines (not shown) that are connected between coil 703 and coil 707 and create a strong magnetic field.

AC signal 719 flows from coil 707 to coil 711 through a connection 745. A current 713 flows through coil 711 in the clockwise direction, which generates a magnetic field that causes flux lines (not shown) to flow in the downward direction. Because flux lines from coil 707 and coil 711 are flowing in opposite directions, the magnetic reluctance is low, and the flux lines magnetically couple together to form closed flux lines (not shown) that are connected between coil 707 and coil 711 and create a strong magnetic field.

AC signal 719 flows from coil 711 to coil 731 through a connection 747. A current 733 flows through coil 731 in the counter-clockwise direction, which generates a magnetic field that causes flux lines (not shown) to flow in the upward direction. Because flux lines from coil 711 and coil 731 are flowing in opposite directions, the magnetic reluctance is low, and the flux lines magnetically couple together to form closed flux lines (not shown) that are connected between coil 711 and coil 731 and create a strong magnetic field.

AC signal 719 flows from coil 731 to coil 727 through a connection 749. A current 729 flows through coil 727 in the clockwise direction, which generates a magnetic field that causes flux lines (not shown) to flow in the downward direction. Because flux lines from coil 731 and coil 727 are flowing in opposite directions, the magnetic reluctance is low, and the flux lines magnetically couple together to form closed flux lines (not shown) that are connected between coil 731 and coil 727 and create a strong magnetic field.

AC signal 719 flows from coil 727 to coil 723 through a connection 751. A current 725 flows through coil 727 in the counter-clockwise direction, which generates a magnetic field that causes flux lines (not shown) to flow in the upward direction. Because flux lines from coil 727 and coil 723 are flowing in opposite directions, the magnetic reluctance is low, and the flux lines magnetically couple together to form closed flux lines (not shown) that are connected between coil 727 and coil 723 and create a strong magnetic field. Similarly, flux lines from coil 723 and coil 703 magnetically couple together to form closed flux lines (not shown) that are connected between coil 723 and coil 703 because the flux lines from coil 723 and coil 703 are flowing in opposite directions.

Current 725 flows from coil 723 to power circuit 715 through a connection 753. Although current 725 through coil 723 and current 709 through coil 707 both flow in the counter-clockwise direction (i.e., the magnetic field generated by current 725 flowing through coil 723 and the magnetic field generated by current 709 flowing through coil 707 have the same polarity), the flux lines emitted by these coils will not affect magnetic coupling of flux lines between coils 703 and 707, coils 707 and 711, coils 711 and 731, coils 731 and 727, coils 727 and 723, and coils 723 and 703. Coil 723 and coil 707 are not adjacent to one another, and instead, are separated by air gap 759a in magnetic layer 701, which results in high reluctance between the flux lines of coil 723 and coil 707. The same is true for coils 703 and 727, which are separated by air gap 759a, coils 727 and 711, which are separated by air gap 759b, and coils 707 and 731, which are separated by air gap 759b. In contrast, coils that generate magnetic fields with opposite polarity are arranged adjacent to one another (e.g., coils 703 and 707, coils 707 and 711, coils 711 and 731, coils 731 and 727, coils 727 and 723, and coils 723 and 703) and are not separated by air gaps 759a or 759b, resulting in low reluctance and coupling of the magnetic fields creating strong magnetic fields.

The embodiment of FIG. 7 has been described with coils 703, 707, 711, 731, 727 and 723 coupled in series. The same result of closed flux lines can be achieved by coupling coils in parallel as described in the embodiment of FIG. 3. For example, coil 703 (wound in the clockwise direction) could be connected in parallel with both coil 707 (wound in the counter-clockwise direction) and coil 711 (wound in the clockwise direction). Further, coil 723 (wound in the counter-clockwise direction) could be connected in parallel with both coil 727 (wound in the clockwise direction) and coil 731 (wound in the counter-clockwise direction). Alternatively, coil 723 (wound in the counter-clockwise direction) could be connected in parallel with coil 703 (wound in the clockwise direction), coil 727 (wound in the clockwise direction) could be connected in parallel with coil 707 (wound in the counter-clockwise direction), and coil 731 (wound in the counter-clockwise direction) could be connected in parallel with coil 711 (wound in the clockwise direction). The embodiment of FIG. 7 can further be expanded by adding additional coils and air gaps, where coils that generate magnetic fields with opposite polarity are adjacent to one another and coils that generate magnetic fields with the same polarity are separated by an air gap.

The transmitters of FIGS. 1-7 are capable of being used in conjunction with any type of receiver coil, including receivers with multiple coils. The transmitters of FIGS. 1-7 can also be configured as receivers since good transmitters are good receivers just as good antennas for transmission are good antennas for reception.

Figure 8:
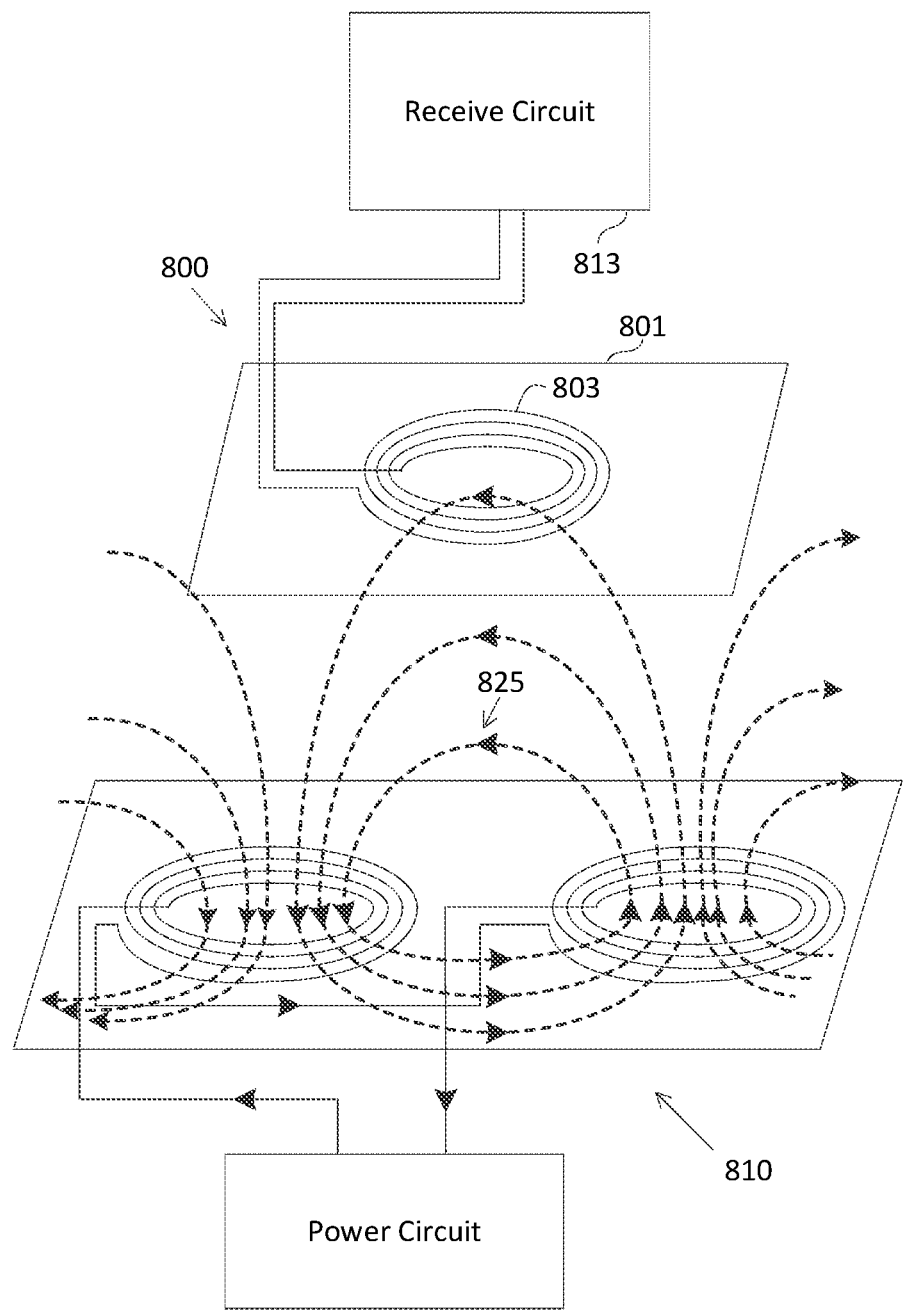
FIG. 8 is a schematic diagram illustrating one embodiment of a wireless power receiver using one coil.

FIG. 8 is a schematic diagram illustrating one embodiment of a wireless power receiver 800 using a single coil. A coil 803 is placed on a magnetic layer 801. Magnetic layer 801 can be ferrite or any other magnetic layer known in the art. Coil 803 is wound in the clockwise direction but could alternatively be wound in the counter-clockwise direction.

A wireless power transmitter 810 (similar to the embodiment of FIG. 4) is driven by a power circuit resulting in each coil emitting a magnetic field. A time-varying current flows through each coil of transmitter 810 in an opposite direction, which causes each coil to generate a magnetic field with opposite polarity. Because the magnetic fields have opposite polarity, the magnetic fields attract and form a strong magnetic field, represented by flux lines 825. The strong magnetic field magnetically couples to coil 803 and a time-varying current flows through coil 803 to a receive circuit 813. Faraday's law provides that the time-varying current that flows in a receiver coil will oppose the magnetic field generated by a transmitter coil. Wireless power transmitter 810 uses two coils, each coil having a time-varying current that flows in an opposite direction. Thus, the direction of the time-varying current that flows in coil 803 will be opposite from the time-varying current that flows in the transmitter coil that is closest to coil 803. Receive circuit 813 can include, but is not limited to, a rectifier to generate a DC voltage, a filter to reduce noise, and a voltage regulator to define a voltage magnitude and maintain the voltage under load. The voltage generated as a result of the coupling of flux lines 825 to coil 803 can be used to charge a battery or power a device (e.g., a smart phone, laptop or any other electronic device).

Figure 9:
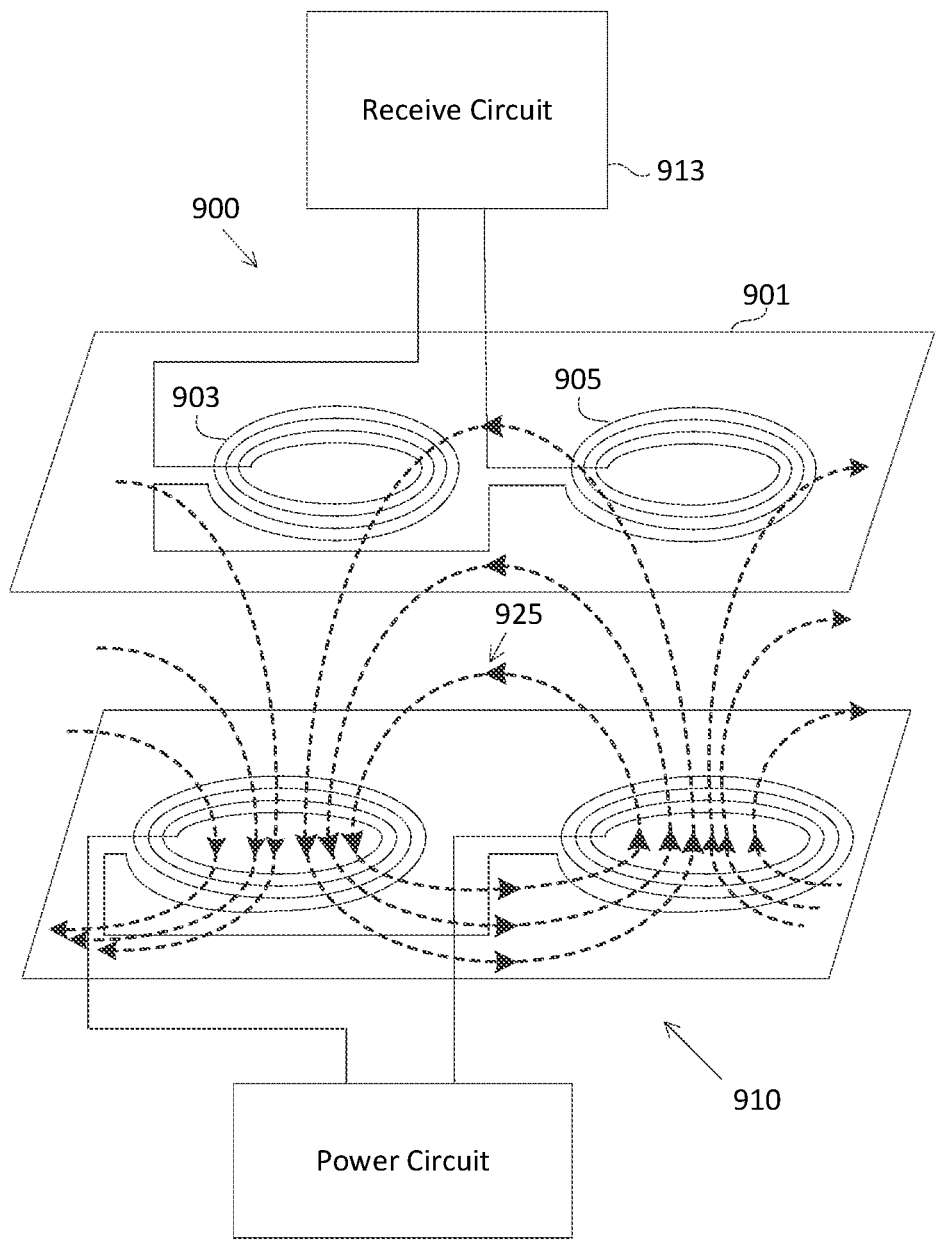
FIG. 9 is a schematic diagram illustrating one embodiment of a wireless power receiver using two coils.

FIG. 9 is a schematic diagram illustrating one embodiment of a wireless power receiver 900 using two coils. A coil 903 and a coil 905 are placed on a magnetic layer 901. Magnetic layer 901 can be ferrite or any other magnetic layer known in the art. Coil 903 and coil 905 are preferably identical coils with the same number of turns, the same area, and wound in the same direction. Coil 903 and coil 905 are both wound in the clockwise direction but both coils could alternatively be wound in the counter-clockwise direction.

A wireless power transmitter 910 (similar to the embodiment of FIG. 4) is driven by a power circuit resulting in each coil emitting a magnetic field. A time-varying current flows through each coil of transmitter 910 in an opposite direction, which causes each coil to generate a magnetic field with opposite polarity. Because the magnetic fields have opposite polarity, the magnetic fields attract and form a strong magnetic field, represented by flux lines 925. The strong magnetic field magnetically couples to coil 903 and coil 905 and a time-varying current flows through coil 903 and coil 905 to a receive circuit 913. Faraday's law provides that the time-varying current that flows in a receiver coil will oppose the magnetic field generated by a transmitter coil. Wireless power transmitter 810 uses two coils, each coil having a time-varying current that flows in an opposite direction. Thus, the direction of the time-varying current that flows in coil 903 will be opposite from the time-varying current that flows in the transmitter coil that is closest to coil 903 (i.e., the transmitter coil below coil 903). Further, the time-varying current that flows in coil 905 is in an opposite direction than the time-varying current that flows in coil 903 and in an opposite direction than the time-varying current that flows in the transmitter coil closest to coil 905 (i.e., the transmitter coil below coil 905). Receive circuit 913 can include, but is not limited to, a rectifier to generate a DC voltage, a filter to reduce noise, and a voltage regulator to define a voltage magnitude and maintain the voltage under load. The voltage generated as a result of the coupling of flux lines 825 to coil 803 can be used to charge a battery or power a device (e.g., a smart phone, laptop or any other electronic device).

The embodiments of FIGS. 1-9 describe the use of a magnetic layer to magnetically couple coils, but magnetic coupling between coils that generate magnetic fields having opposite polarity can also be achieved without the use of a magnetic layer. The coils can simply be placed in close physical proximity to one another, which is also sufficient to allow magnetic coupling. Without the use of a magnetic layer, coils that generate magnetic fields having the same polarity can be placed farther apart from one another (i.e., large air gap between the coils) such that coils generating magnetic fields with the same polarity do not interfere with the magnetic coupling of coils generating magnetic fields having opposite polarity.

Further, in all embodiments, coils that generate magnetic fields having opposite polarity can be placed adjacent to one other, or can be placed close enough to one another such that the coils partially overlap. For example, in the context of two coils, the outer edge of one coil can pass through the geometric center of the other coil, and vice versa. Similarly, the first coil and the second coil can be separated by a distance that is approximately equal to five times the diameter of the coils. These dimensions are not intended to be limiting as the use of different types of coils (i.e., coils having different number of turns, shapes, etc.) and different materials for the magnetic layer, among other factors, may allow for more overlap or larger separation between the coils.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A wireless power device comprising:
a power source configured to generate a first time-varying current;
a plurality of first coils configured to receive the first time-varying current from the power source, wherein the first time-varying current flows in each of the first coils in a first direction;
a plurality of second coils coupled to the plurality of first coils and configured to receive the first time-varying current, wherein the first time-varying current flows in each of the second coils in a second direction, wherein the first direction is opposite from the second direction; and
a substantially planar magnetic layer configured to magnetically couple the plurality of first coils and the plurality of second coils, the substantially planar magnetic layer comprising a plurality of air gaps, each air gap configured to magnetically isolate diagonally positioned coils of the same type from each other,
wherein the plurality of first and second coils are arranged relative to the plurality of air gaps such that a first coil of the plurality of first coils is adjacent to at least two second coils of the plurality of second coils and diagonally opposite from another first coil of the plurality of first coils in relation to an air gap of the plurality of air gaps, and a second coil of the plurality of second coils is adjacent to at least two first coils of the plurality of first coils and diagonally opposite from another second coil of the plurality of second coils in relation to an air gap of the plurality of air gaps.

2. The wireless power device of claim 1, wherein a first coil of the plurality of first coils is coupled in series with a second coil of the plurality of second coils.

3. The wireless power device of claim 1, wherein a first coil of the plurality of first coils is coupled in parallel with a second coil of the plurality of second coils.

4. The wireless power device of claim 1, wherein a central axis of each of the plurality of the first and second coils is normal to a surface of the substantially planar magnetic layer.

5. The wireless power device of claim 1, wherein each of the plurality of first coils and each of the plurality of second coils have an equal number of turns, substantially the same shape, and substantially the same area.

6. The wireless power device of claim 1, wherein the power source is configured to generate a second time-varying current and a second coil of the plurality of second coils is configured to receive the second time-varying current from the power source.

7. The wireless power device of claim 6, wherein the second coil of the plurality of second coils is coupled to a first coil of the plurality of first coils in such a way that the first time-varying current that flows in the first coil is the same as the second time-varying current that flows in the second coil.

8. The wireless power device of claim 7, further comprising a capacitor coupled between the power source and a first coil of the plurality of first coils.

* * * * *